MAGNETIC-CORE SHIFT REGISTER

Filed Aug. 6, 1959 3 Sheets-Sheet 1

INVENTORS.
HEWITT D. CRANE
WILLIAM K. MACCURDY
BY
Lyon & Lyon
ATTORNEYS.

INVENTORS.
HEWITT D. CRANE
WILLIAM K. MACCURDY
BY
Lyon & Lyon
ATTORNEYS.

MAGNETIC-CORE SHIFT REGISTER

Filed Aug. 6, 1959 3 Sheets-Sheet 3

INVENTORS.
HEWITT D. CRANE
WILLIAM K. MacCURDY
BY
Lyon & Lyon
ATTORNEYS.

United States Patent Office 3,139,609
Patented June 30, 1964

3,139,609
MAGNETIC-CORE SHIFT REGISTER

Hewitt D. Crane, Palo Alto, and William K. MacCurdy, Menlo Park, Calif., assignors to AMP Incorporated, Harrisburg, Pa., a corporation of New Jersey Filed Aug. 6, 1959, Ser. No. 832,013
9 Claims. (Cl. 340—174)

Shift registers, wherein the bistable storage devices employed for each stage consist of magnetic toroidal cores which have two states of stable remanence, have been known for some time. It was initially found that a certain isolation had to be provided between the stages. This isolation was achieved through the use of diodes. A shift register of the type using diodes is described in an article entitled, "Magnetic Delay Line Storage," by A. Wang, in The Proceedings of the I.R.E., volume 39 (April 1951), pp. 401 through 407. The magnetic core preferred for these registers usually had the shape of a toroid. There was only a single main aperture in the core. With the invention of a multiaperture core, it was found that the required interstage isolation could be achieved without diodes. One type of multiaperture core is also known as a transfluxor and is described in an article entitled, "The Transfluxor," by Rajchman and Lo, in The Proceedings of the I.R.E., volume 43 (March 1956), pp. 328–338, and also in a second article by the same authors and entitled, "The Transfluxor—A Magnetic Gate With Stored Variable Settings," in the RCA Review, volume 16 (June 1955), pp. 303 through 311. In an article entitled, "Logic System Using Magnetic Elements and Connecting Wire Only," by H. D. Crane, in The Proceedings of the I.R.E., volume 47, pp. 63 through 73 (January 1959), there is described a magnetic-core shift register wherein the cores are of the multiple aperture type and no diodes are used for isolation.

The wiring required for operating a shift register using multiaperture cores of the type described in the abovementioned article by Crane is quite complex. Also, where connections are made to interstage coupling loops, such connections must be exactly placed to achieve desirable operation. A further factor adding to the difficulties of wiring these cores is that the sizes of the apertures in the cores which must be threaded with wire is on the order of mils.

An object of this invention is to provide a simplified wiring arrangement for a multiaperture magnetic-core shift register for reducing manufacturing costs.

Another object of the present invention is to provide a novel wiring arrangement for a multiaperture magnetic-core shift register.

Yet another object of the present invention its to provide a more compact package for a magnetic-core shift register than has been available heretofore.

These and other objects of the invention may be achieved by aligning the odd-numbered cores in the sequence of cores employed in the shift register in a column, so that their apertures are aligned. The even-numbered cores in the sequence of cores in the register are also positioned in a column to have all their apertures aligned. The column of even-numbered cores is displaced or offset from the column of odd-numbered cores. At this point it should be noted that the multiaperture cores employed in the shift register may be of the type which has one central or main aperture and at least two other apertures in the toroid arms which may be respectively designated as a transmit aperture and a receive aperture. By thus aligning and offsetting the odd and even numbered cores to provide two adjacent columns of cores, the effort involved in applying the required windings is considerably simplified.

A further simplification of the wiring required for the register may be achieved as follows. A first conductive tube is inserted through all the aligned transmit apertures of the odd-numbered cores. A second conductive tube is inserted through the aligned receive apertures of all except the first odd-numbered cores. A third conductive tube is inserted through the transmit apertures of all the even-numbered cores but the last one in the sequence, which is the last core of the shift register. A fourth conductive tube is inserted through all the aligned receive apertures of all the even-numbered cores. Connections are made between the first and fourth tubes to form coupling loops between the transmit apertures of the odd-numbered cores and the receive apertures of the even-numbered cores. These loops will include the first and fourth conductive tubes, whereby a data transfer may be effectuated between the odd- and even-numbered cores. Also, connections are made between the third and second conductive tubes to effectuate coupling loops between the transmit apertures of the even-numbered cores and the receive apertures of the odd-numbered cores, whereby a transfer of data from the even to the odd cores may be effectuated. The conductive tubes not only afford a simple coupling loop structure, but also enable the small apertures to be easily threaded with the necessary wiring for advancing data between cores, which wiring otherwise would be difficult to effectuate. In addition, the conductive tubing provides a better and stronger shift register structure. By reason of the offset arrangement of the odd and even cores, a more compact shift register is achieved.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURES 1, 2, and 3 are circuit diagrams of shift registers employing multiaperture cores which are shown for the purpose of assisting in an understanding of this invention;

Figure 1:
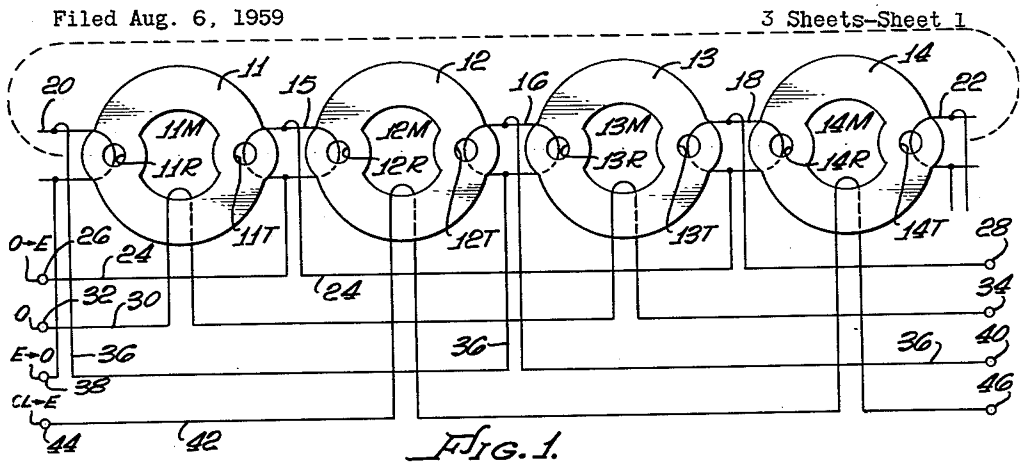

FIGURE 1 is the circuit diagram of a shift register of the type described in the above-noted article by H. D. Crane. FIGURE 1, together with FIGURES 2 and 3, which illustrate other types of multiaperture shift register wiring, are shown in order to provide a better understanding and appreciation of the present invention. The shift register in FIGURE 1 is of the type requiring two multiaperture cores for storing one bit of data. Only four cores 11, 12, 13, 14 are shown by way of exemplification of the shift register. In the numbered sequence of the cores, it will be obvious that cores 11 and 13 are the odd-numbered cores in the sequence and cores 12 and 14 are the even-numbered cores in the sequence. Each one of the cores has a central main aperture 11M, 12M, 13M, 14M. Each one of the cores also has two small apertures in the arms of the toroid which are respectively designated as a receive aperture 11R, 12R, 13R, 14R, and a transmit aperture 11T, 12T, 13T, 14T. The transmit aperture of each core is coupled to the receive aperture of a succeeding core in the sequence by a coupling loop, respectively 15, 16, and 18, each of which comprises a closed loop passing through the transmit and receive apertures of the adjacent cores. Input to the shift register may be obtained by means of an input loop 20, which is coupled to the receive aperture 11R of the first core 11. An output may be derived from the shift register by an output loop 22, which is coupled to the transmit aperture 14T of the core 14.

The shift register exemplified in FIGURE 1 operates on what is known as a four-beat cycle. By this is meant it takes four different intervals, or four clock pulses, in order to effectuate a shift of data, either from one odd-numbered core to the succeeding odd-numbered core, or from one even-numbered core to the succeeding even-numbered core. This will be better understood from the following explanation. Assume that one bit of data has been entered into the core 11. The first operation to occur in transferring that bit of data is to apply a current pulse to an "odd-to-even" advance winding 24. This winding extends from the terminal 26 to the center of one side of the coupling loop 15. It then extends from the other side of the coupling loop 15 to the center of the coupling loop 18. The advance winding 24 then extends from the other side of the coupling loop 18 to the terminal 28. It will be understood that if the shift register were extended, the odd-to-even transfer winding 24 would be connected to each one of the coupling loops which couples the transmit aperture of an odd core to the receive aperture of an even core in the core sequence of the register.

The result of applying an excitation to the winding 24 is to advance the data bit in the odd core 11 to the even core 12. Simultaneously, any data bits in all of the other odd cores would be transferred to the succeeding even cores. The next step in the four-beat cycle is to clear all the odd cores. This is done by applying a current pulse to a clear winding 30. This clear winding 30 extends from a terminal 32 to successively couple to all the odd cores through their main apertures and then terminates at a terminal 34.

The next step in the four-beat cycle is to transfer the data from the even-numbered cores in the shift register to the odd-numbered cores. This is done by applying excitation to an even-to-odd core transfer winding 36. This winding extends from a terminal 38 successively to and through each one of the coupling loops which couple the transmit aperture of the even-numbered cores to the receive aperture of the succeeding odd-numbered cores. This winding terminates at a terminal 40. After the data transfer from the even to odd cores, a clear even-core winding 42 has a current pulse applied thereto whereby the even cores in the shift register are reset to their clear condition. The clear even-core winding 42 extends from a terminal 44 coupling to all even-numbered cores through their main apertures and ends at a terminal 46.

The details of the storage and transfer mechanism of the multiaperture cores and the associated wiring will not be discussed herein, in view of the published description in the Crane article and others referred to above. Briefly, however, when one of the multiaperture cores is in its clear, or zero, condition, then the application of a current, in the proper direction to a loop coupled to the receive aperture of a core, which current exceeds a certain threshold value, can effectuate a flux change in that core. This flux change enables switching of the flux around the transmit aperture of the same core to be achieved by applying current which exceeds a threshold value in the proper direction to a coupling loop passing through that transmit aperture. The value of the current threshold required to achieve flux switching about the transmit aperture of the core is lower than the value of the current threshold required to achieve a flux change in the core from the receive aperture. A core which is in a state whereby flux may be changed about its transmit aperture with the lower threshold value current is said to be in its one state. Otherwise, it is in its zero state.

Unity turns ratio may be employed for the windings in this type of shift register. Furthermore, single turn transmit and receive windings enable the shift register to be driven bilaterally, the direction of drive being determined by the direction of the drive currents. Using single turn windings, the current which is applied to the odd-to-even transfer windings, or the even-to-odd transfer windings, is usually equal to twice the upper threshold value, or the value required to effectuate a flux change about the core main aperture, which results in setting the core to its one state. By reason of the connections made to the various coupling loops, the value of the current which actually passes through the transmit and receive apertures is one-half of the value which is applied to the terminals to which the transfer winding is connected. If a core is in a zero state, then the full threshold value current passing through its transmit aperture has no effect on the core. Similarly, the full threshold value current passing through the receive aperture of a core does not affect that core. However, should a core be in its one state, then the flux about its transmit aperture can be switched by the full threshold value current, which exceeds the threshold value necessary to switch flux about the small aperture. As a result of this flux-switching, a voltage is induced in the coupling loop which causes the remaining current to be "steered" about the half of the coupling loop which threads the receive aperture. This current exceeds the value necessary to drive the succeeding core to its one state, and thereby the data bit in the preceding core has been transferred to the succeeding core.

Figure 2:
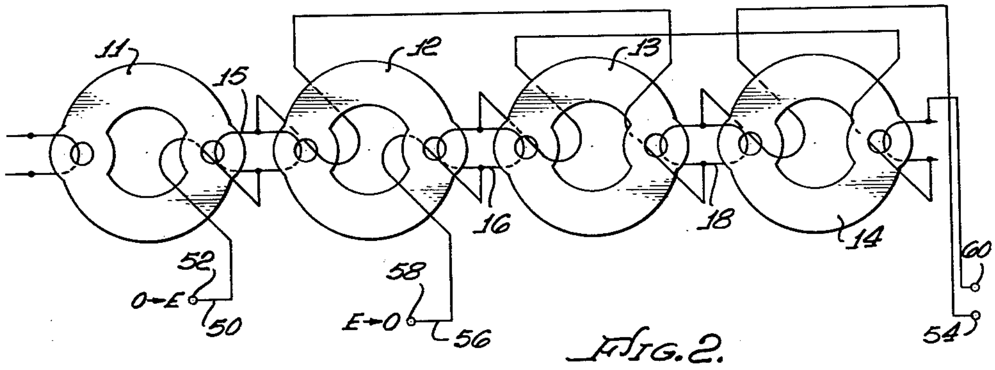

FIGURE 2 shows another known arrangement for the odd-to-even transfer winding and even-to-odd transfer winding in a multiaperture core type of shift register. In order to maintain clarity in the drawing, the clear-odd and clear-even windings are omitted. The manner in which they would be coupled to the cores is the same as is shown in FIGURE 1, however. In order to increase the "excess" magnetomotive force at the core having the transmit aperture available for driving the core having the receive aperture, the transfer windings may be threaded through the transmit and receive apertures in a direction to assit the operation of the coupling loops. Thereby, since the number of turns threading the apertures is increased, the amplitude of the current required for achieving the threshold value may be decreased. Thus, an odd-to-even transfer winding 50 extends from a terminal 52 through the main aperture of the core 11 to one side of the center of the coupling loop 15. The transfer winding 50 then extends from the center of the other side of the coupling loop 15 through the receive aperture of the core 12, and thereafter through the main aperture of the core 12 to and through the main aperture of the core 13. Thereafter, the odd-to-even transfer winding 50 passes through the transmit aperture of the core 13 to the center of one side of the coupling loop 18. Thus, the transfer winding 50 will couple to the transmit and receive apertures of the respective odd and even cores until it ends at the terminal 54.

The even-to-odd transfer winding 56, likewise, extends from a terminal 58 through the main aperture of the core 12, and thereafter through the transmit aperture of the core 12 to the center of one side of the coupling loop 16. From the other side of the coupling loop 16, the transfer winding 56 will pass through the receive aperture of the core 13 and thereafter through the main aperture of the core 13. The transfer winding 56 will then extend through the main aperture of the core 14 and thereafter through the transmit aperture of the core 14 to one side of the succeeding transfer loop. It will thereafter thread in similar fashion through the transmit apertures of the exen-numbered cores and the receive apertures of the odd-numbered cores until it ends at a terminal 60.

Figure 3:
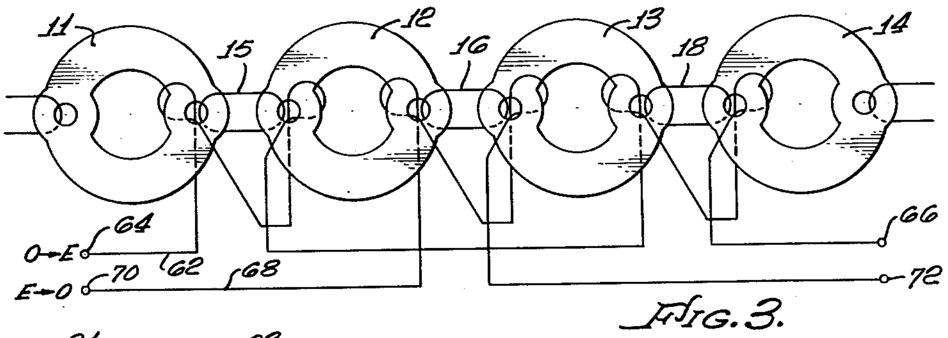

FIGURE 3 shows a known arrangement for the transfer windings and coupling loops in a shift register known as a "floating" coupling loop arrangement. Because, with a directly driven coupling loop, care has to be exercised in physically connecting to the loops so that the proper ratios of parasitic resistance and inductance are maintained in the two halves, and because of the fact that the use of the same advancing current in the coupling loops and windings of the type shown in FIGURE 2 imposes restrictions on the combination of turns that may be used, the floating coupling-loop arrangement may be more desirable. Effectively, the advancing windings are passed through the receive-transmit apertures of the cores in a manner so that a transformer coupling exists with the coupling loop. The reference numerals applied to the cores and coupling loops in FIGURE 3 are the same as they are in FIGURES 1 and 2, in view of the fact that the same functions and operations occur with these structures.

An odd-to-even advance winding 62 extends from a terminal 64 through the transmit aperture of the core 11, then around the leg of the core defined by the transmit aperture and the main aperture, thereafter through the transmit aperture again and up through the receive aperture of the core 12. The winding then passes through the main aperture of the core 12 and back through the receive aperture of the core 12 to extend through the transmit aperture of the core 13 in similar fashion as through the transmit aperture of the core 11. The odd-to-even transfer winding 62 will thereafter extend in coupling loops through the transmit apertures of the odd-numbered cores and through the receive apertures of the even-numbered cores until it reaches a terminal 66.

An even-to-odd advance winding 68 extends from a terminal 70 and will couple through the transmit aperture and main aperture of the core 12 and around the leg between the transmit aperture and main aperture of the core. The winding 68 will then extend to be coupled to the leg between the receive aperture and main aperture of the core 13. The winding 68 will thereafter successively be coupled to the legs between the transmit apertures and main apertures of the even-numbered cores and the legs between the receive apertures and main apertures of the odd-numbered cores extending until it reaches a terminal 72. A current applied to the odd-to-even transfer winding 62 will both apply an assisting bias to the cores for the transfer of data from the odd to the even cores and will also induce a voltage in the transfer loops involved which provides a sufficient current to effectuate transfer of the data bits between cores. A similar function is provided by the even-to-odd transfer winding 68.

In constructing a shift register to have a usable capacity, for example, on the order of 75 bits, it will be appreciated that a substantial problem exists in placing the required operating windings on the cores. Furthermore, the size of the shift register is rather cumbersome, when the cores are laid out flat in the manner illustrated in FIGURES 1, 2, and 3 of the drawings. One way of reducing the size of the shift register is to align the cores in the manner shown in FIGURE 4. An edge view of the cores is shown. The cores have the reference numerals 81, 82, 83, 84, 85, and 86 applied thereto to represent the order of their sequence, as well as to indicate the odd- and even-numbered cores in the sequence. The odd-numbered cores are offset from the even-numbered cores. Both odd- and even-numbered cores have all their apertures aligned. Thus, a column of odd-numbered cores 81, 83, 85 has offset therefrom a column of even-numbered cores 82, 84, 86.

Figure 4:
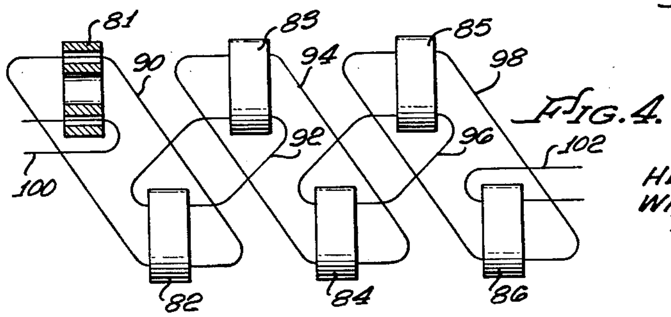
FIGURE 4 illustrates a preferred placement of magnetic cores in a shift register and the required coupling loops in accordance with this invention.
Figure 5A:
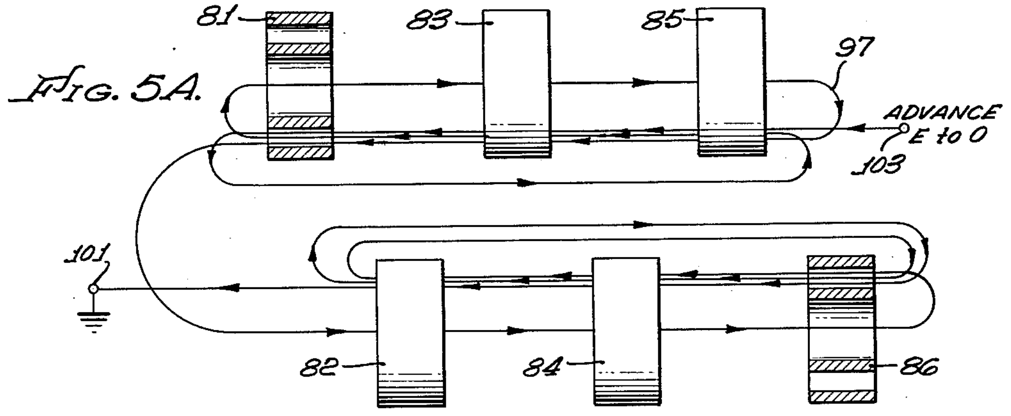
FIGURES 5A and 5B are circuit diagrams of respectively even-to-odd data shift windings and odd-to-even data shift windings employed in a shift register in accordance with this invention.
Figure 5B:
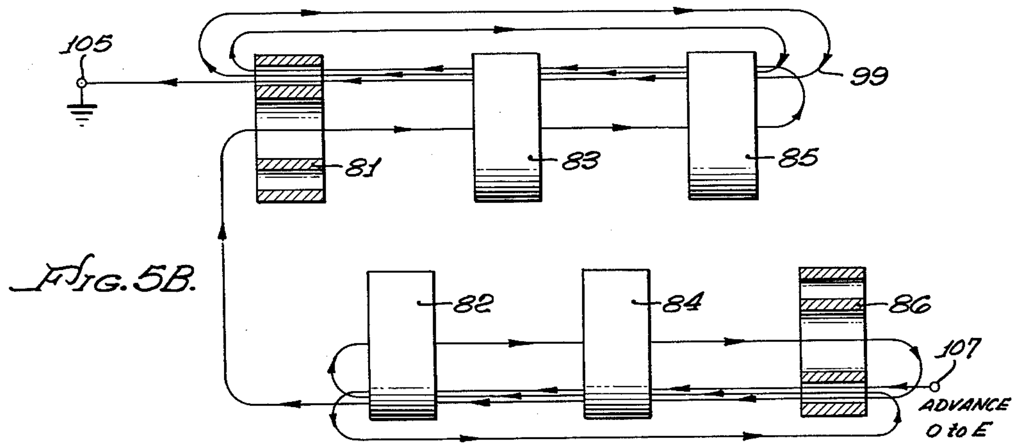

It should now be apparent that the arrangement of the cores and coupling loops shown in FIGURE 4, besides permitting a savings in the space required for a shift register and enabling a compact package to be made thereof, also considerably simplifies the labor required in applying the odd-to-even core-advancing winding as well as the even-to-odd core-advancing winding. Thus, if the advancing windings of the type shown in FIGURE 2 are desired, then with the cores arranged in adjacent columns of odd- and even-numbered cores as shown in FIGURE 4, this is simply effectuated by applying a conductive connection between each of the coupling loops shown in FIGURE 4. FIGURES 5A and 5B show how simple it is to apply really complex inductively coupled advancing windings of the preferred type shown in FIGURE 3, with cores arranged in the manner shown in FIGURE 4.

Figure 6:
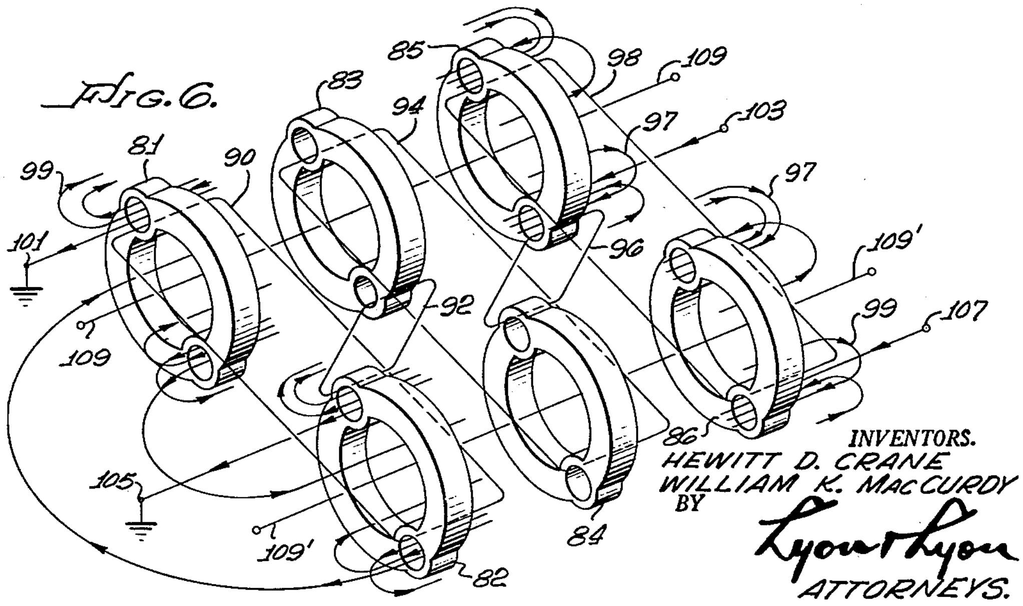
FIGURE 6 is an isometric view of an embodiment of the invention combining the arrangements of the cores and windings shown in FIGURES 4, 5A, and 5B.

The odd-to-even and even-to-odd advancing windings for a shift register in accordance with this invention are respectively shown as FIGURES 5A and 5B in order to preserve simplicity in the drawings and explanation. It should be understood, however, that a shift register will have the coupling loops or data transfer windings 90–98 as shown in FIGURE 4, an odd-to-even winding 97 as shown in FIGURE 5A, and an even-to-odd winding 99 as shown in FIGURE 5B. Also, as previously pointed out, there is required a clear winding for resetting all odd-numbered cores and a separate clear winding for resetting all even-numbered cores. The assemblage of these is shown in FIGURE 6, which is a perspective view of a shift register in accordance with this invention, showing the placement of the cores as well as the required windings, with certain portions of the windings omitted where required for preserving clarity in the drawing. In the description that follows, reference will be made to FIGURES 5A, 5B, and 6. Similar functioning structure will have the same reference numerals applied thereto in each of FIGURES 4, 5A, 5B, and 6.

Referring now to FIGURE 5A, there may be seen a preferred arrangement for an "even-to-odd" advancing winding 97. It extends from a terminal 101 through the transmit apertures of all the even-numbered cores. It is then brought back outside of the column of even-numbered cores to the first even-numbered core. Winding 97 is then threaded through the transmit apertures of the even-numbered cores, brought back around the outside of the column of even-numbered cores again, and then threaded through the transmit apertures of all the even-numbered cores a third time. The winding 97 is then brought back through the main apertures of the cores in the column of even-numbered cores 82, 84, 86, and then is passed through the aligned receive apertures of all of the odd-numbered cores 81, 83, 85. The winding 97 is then passed to the front of the column through the aligned main apertures of all the odd-numbered cores. The winding 97 is then passed through the aligned receive apertures of the column of odd-numbered cores again. The winding is then extended to the front end of the column of odd-numbered cores outside of the column of cores and thereafter threaded through the receive apertures of the column of odd-numbered cores and extended to terminal 103.

In FIGURE 5B, the "odd-to-even" advancing winding 99 is essentially the same as the "even-to-odd" advancing winding except that it passes through all the aligned transmit apertures of the cores in the column of odd-numbered cores and through all the aligned receive apertures of the cores in the column of even-numbered cores. Thus, the winding 99 first extends from a terminal through all the aligned transmit apertures of the cores 81, 83, 85. It is then returned outside of the column of cores to the front of the column of odd-numbered cores to be again passed through all of the aligned transmit apertures. The winding 99 is then returned outside of the column of odd-numbered cores to the first core of the column. It is then passed through all the transmit apertures of all the odd-numbered cores a third time after which it is brought forward through the aligned main apertures of the column of odd-numbered cores. The winding is then threaded through the aligned receive apertures of all the cores in the column of even-numbered cores. The winding 99 is then brought forward through the aligned main apertures of the column of even-numbered cores. It is then passed back through the aligned receive apertures of all the even-numbered cores a second time. It is then brought forward outside of the column of even-numbered cores and thereafter passed through the aligned receive apertures of the cores in the column of even-numbered cores and extended to a terminal 107.

The advancing windings shown in FIGURES 5A and 5B have more than one turn passing through the transmit and receive apertures while the advancing windings 62, 68 shown in FIGURE 3 have only one turn. However, the underlying principles in connection with the operation of the register are the same. The ease of threading these multiple-turn advancing windings through the aligned apertures of the cores arranged in accordance with this invention over the arrangement shown in FIGURE 3 should be readily apparent. The number of turns for the advancing winding as well as the number of cores shown in FIGURES 5A and 5B are not to be construed as a limitation or restriction, since as many turns as are required for a particular type and size of core, as well as many cores as are desired for a register, may be employed without departing from teachings of this invention.

In FIGURE 6, the cores 81–86, the transfer windings 90–98, and the advancing windings are shown assembled. In addition, a clear winding 109 for all cores in the column of odd-numbered cores and a clear winding 109′ in the column of even-numbered cores is shown. This may comprise one or more turns as required (only one turn being shown) which can be easily passed through the aligned main apertures of the cores in the respective columns. The arrangement of cores and windings shown in FIGURE 6 can be potted in any suitable material to provide a compact register package.

Figure 7:
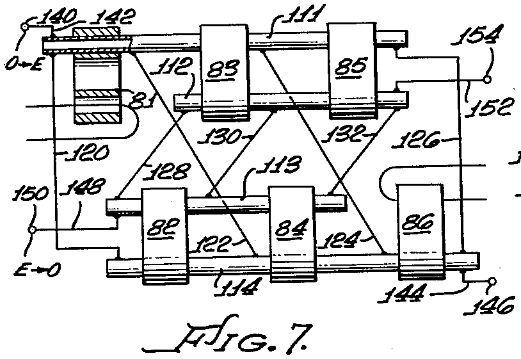
FIGURE 7 is a drawing of shift-register coupling loops in accordance with this invention.

FIGURE 7 shows an embodiment of the invention whereby the coupling loops or transfer windings may be simply, rapidly, and accurately constructed, as well as affording an efficient and inexpensive means for providing the required advancing winding. In accordance with this invention, a first conductive tube 111 is inserted through all the transmit apertures of the odd-numbered cores 81, 83, 85. A second conductive tube 112 is inserted through all the receive apertures of all the odd-numbered cores except the first in the sequence. A third conductive tube 113 is inserted through all the aligned transmit apertures of the even-numbered cores of the sequence except the last core 86. A fourth conductive tube 114 is inserted through all the aligned receive apertures of the even-numbered cores in the sequence. Connections can then be made, using any suitable conductors between the tubes 111 and 114 (odd-transmit to even-receive) and between the tubes 113 and 112 (even-transmit to odd-receive), to complete the coupling loops.

By way of example, the conductors 120, 122, 124, and 126 close transfer loops between the odd- and even-numbered cores. Conductor 120 connects from the end of tube 111, which extends from the transmit aperture of the first core 81, to the end of tube 114, which extends from the receive aperture of core 82. Conductor 122 connects from tube 111 between adjacent cores 81, 83 to tube 114 between the adjacent even cores 82, 84. Conductor 124 connects from tube 111 between adjacent odd cores 83, 85 to tube 114 between the adjacent even cores 84, 86. Conductor 126 connects from the end of tube 111, which extends from the transmit aperture of core 85 to the end of tube 114, which extends from the receive aperture of core 86. The connections to the conductive tubes should be made so that the cores are evenly spaced away from the connection points. This is a simple matter to effectuate, since the tubes are rigid and connecting points and core positions may be readily marked thereon. When wire is used for coupling loops, in view of the flexibility of the wire, difficulty is experienced in finding exactly the center of a coupling loop for soldering.

In FIGURE 7, three conductors are employed for closing the coupling loops between the even-core transmit apertures and the odd-core receive apertures. Thus, conductor 128 connects from the end of the tube 113, which extends from the transmit aperture of core 82 to the end of the tube which extends from the receive aperture of the core 82. Conductor 130 connects the portion of the tube 113 between cores 82 and 84 to the portion of the tube 112 between the cores 83 and 85. Conductor 132 connects the end of the tube 113 which extends from the transmit aperture of core 84 to the end of the tube 112, which extends from the receive aperture of the core 85.

In order to achieve the type of transfer windings shown in FIGURE 1, tubes 111, 112, 113, and 114 need not be hollow. For other types of transfer windings, the tubes are made hollow and can thus serve as a means for enabling the simple and rapid threadings of the transmit and receive apertures of the cores. Referring again to FIGURE 7, a connection is made from a terminal 140 by means of a wire 142 to one end of tube 111. From the end of tube 114, opposite to the end to which wire 142 is connected to tube 111, a lead or wire 144 is connected to a terminal 146. By these connections, a single-turn odd-to-even transfer winding is provided for the shift register shown in FIGURE 7. This will be seen from the fact that current applied to terminals 140 and 146 will flow, for example, over the lead 142 along tube 111 through coupling loops connecting the transmit apertures of the odd cores to the receive apertures of the even cores and out over lead 144 and terminal 146. The coupling loop between cores 81 and 82 includes the portion of tube 111, which extends through the transmit aperture of core 81, the two conductors 120, 122, and the portion of the tube 114, which extends through the recieve aperture of core 82. The coupling loop between cores 83 and 84 comprises that portion of the tube 111 which extends through the transmit aperture of core 83, the conductors 122 and 124, and that portion of tube 114 which extends through the receive aperture of core 84. Similarly, the coupling loop between cores 85 and 86 includes that portion of tube 111 which extends through the transmit aperture of core 85, the conductors 124 and 126, and that portion of tube 114 which extends through the receive aperture of core 86.

An even-to-odd transfer winding can also be simply effectuated by connecting a lead 148 from a terminal 150 to one end of the tube 113. Another lead 152 is connected from the end of tube 112, which extends from the receive aperture of core 85 to a terminal 154 to complete the even-to-odd transfer winding. The coupling loop between cores 82 and 83 is made up of the portion of tube 113 which is extending through the transmit aperture of core 82, conductors 128, 130, and the portion of tube 112 which extends through the receive aperture of core 83. The coupling loop between cores 85 and 84 is made up of the portion of tube 113 which extends through the transmit aperture of core 84, the conductors 130, 132, and the portion of tube 112 which extends through the receiver aperture of core 85. The clear windings are omitted from the shift register shown in FIGURE 7 in order to avoid complexity in the drawings. It will be appreciated, however, that the odd-core clear winding can be easily inserted by extending the clear winding through the main apertures of all the aligned odd cores. The even-core clear winding for clearing the even cores is made by extending the even-core clear winding through all the aligned main apertures of the even cores.

Figure 8A:
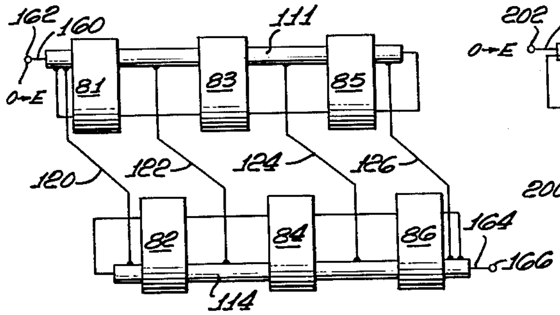
FIGURES 8A and 8B are circuit diagrams respectively of odd-to-even data shift windings and even-to-odd data shift windings employed in a shift register in accordance with this invention.
Figure 8B:
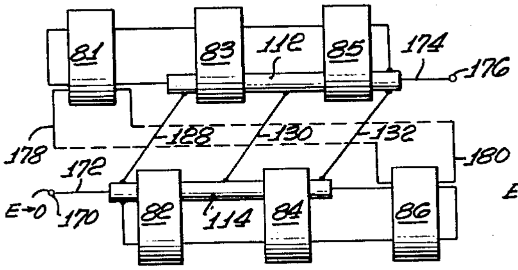

FIGURES 8A and 8B show another embodiment of the invention which is an arrangement for obtaining the type of advancing windings shown in FIGURE 2. FIGURE 8A shows the odd-to-even core-advancing winding, and FIGURE 8B shows the even-to-odd core-advancing winding in accordance with this invention. These have been separated into two figures in order to keep the drawings simple and clear. Similar functioning structures will be given the same reference numerals as are used in FIGURE 7. Thus, the cores 81 through 86 are aligned in odd and even columns offset from one another. The tube 111 is passed through all the transmit apertures of the odd-numbered cores. A tube 114 is passed through all the receive apertures of the even-numbered cores. Conductors 120, 122, 124, and 126 are connected between the tubes 111 and 114 in the same manner as was described in FIGURE 7 to complete the coupling loops between the odd-core transmit apertures and the even-core receive apertures.

An odd-to-even transfer winding is fabricated by extending a lead 160 from a terminal 162. The lead extends through the tube 111; thereafter, it is brought back through the main apertures of the odd-numbered cores in the sequence, and then is connected or attached to the end of tube 111, which extends from the transmit aperture of core 81. Another lead 164 extends from a terminal 166, through the tube 114, and then back through the main apertures of the even-numbered cores, and is finally attached to the end of the tube 114, which extends from the receive aperture of core 86, the last of the even-numbered cores in the illustrative shift register. Current flow from terminal 162 to termianl 166 will proceed through the transmit apertures of the odd-numbered cores through the coupling loops between the odd- and even-numbered cores, and thereafter through the receive apertures of the even-numbered cores. Thus, the effect of an increased number of turns is achieved at the transmit and receive apertures.

In FIGURE 8B, there may be seen the structure required in order to provide an even-to-odd core-transfer winding for the cores 81 through 86. As indicated, this will include both the tube 112, which extends through the receive apertures of all but the first of the odd-numbered cores in the shift register, and the tube 114, which extends through the transmit apertures of all but the last core of the even-numbered cores. Conductors 128, 130, and 132 are also employed in order to complete the coupling loops between the transmit apertures of the even-numbered cores and the receive apertures of the odd-numbered cores. An even-to-odd transfer winding is provided by extending a lead 172 from a terminal 170 through tube 113, then through the transmit aperture of core 86, the last of the even-numbered cores, then back through the main apertures of all the even-numbered cores to a connection to the tube 113, which is made at the portion of the tube which extends from the transmit aperture of core 82. A second lead 174 extends from a terminal 176 through tube 112, and then through the receive aperture of the first core in the sequence, then back through the main apertures of all the odd-numbered cores, until it finally makes connection with end of the tube 112, which extends from the receive aperture of the last of the odd-numbered cores. It will be seen that the transfer current flows through the transmit and receive apertures respectively of the even- and odd-numbered cores, as well as through the core-coupling loops, whereby the value of the transfer current may be made less than required for the embodiment shown in FIGURES 1 and 7.

In order to convert the register shown in FIGURES 8A and 8B into a circulating register, it is merely necessary to couple the input loop 178 to the output loop 180 in the manner illustrated by the dotted lines in FIGURE 8B. The wire leads 172 and 174, which respectively pass through the transmit aperture of core 86 and the receive aperture of core 84, may induce a voltage in the "end-around coupling loop" sufficient to cause transfer. More than one turn may be taken through the respective transmit and receive apertures with the leads 172, 174, if more drive is required. A preferred arrangement for effectuating such "end-around circulation," which avoids a large number of the difficulties encountered as a result of undesirable inductive pickup and insufficient drive, are avoided by an arrangement shown in FIGURE 9. A noninductive and balanced feedback connection between the loop 178 and the loop 180 is achieved by employing two flat strips of a conductor, such as copper, which have substantially the same dimensions. These are held in substantially superimposed relationship and spaced by a suitable insulating material in a layer 186 between the two flat strips. A suitable layer was made by using tape which has adhesive on both sides. The coupling loop 178 has each of its ends connected to the end of the strips 182 and 184 which are nearest to the core 81. The coupling loop 180 has both of its ends respectively connected to the strips 182, 184 which are closest to the core 86. Obviously, the strips 182 and 184 will extend to the location at which such coupling can be made.

A lead 188 connects from the terminal 176 to a connection point 190, which is at the center of the terminal strip 182. Another lead 192 extends from a connection point 194, which is connected at the center of the strip 184, to a terminal 196. Thus, the even-to-odd transfer current applied between terminals 170 and 196, besides flowing through the transmit apertures of the odd-numbered cores and the receive apertures of the even-numbered cores, will flow noninductively through the coupling loop made of the loops 178 and 180 and the two conductive strips 182 and 184. This technique negatives adverse pickup and assures sufficient excitation to achieve the transfer of data bits from the last to the first core in the register.

Figure 10A:
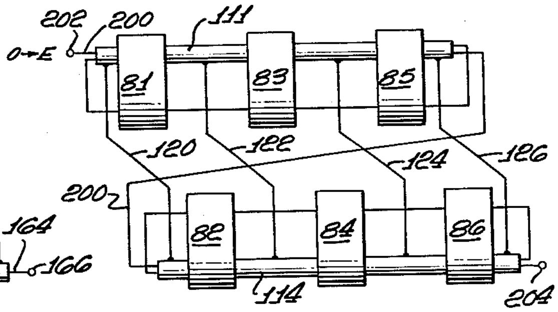
FIGURE 10A and 10B are respectively the odd-to-even data shift winding and the even-to-odd data shift winding employed in a shift register in accordance with this invention.
Figure 10B:
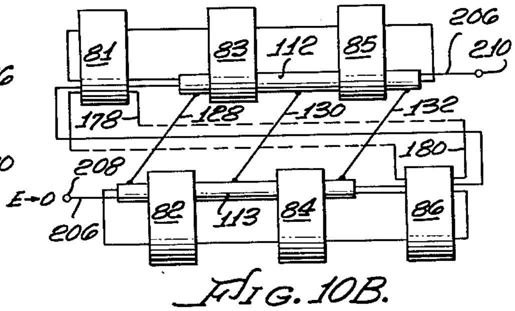

FIGURES 10A and 10B comprise an arrangement in accordance with this invention for achieving floating coupling loops of the type shown in FIGURE 3. As before, the tubes 111 and 114 are respectively inserted through the transmit apertures of the odd-numbered cores and through the receive apertures of the even-numbered cores. Conductors 120, 122, 124, and 126 serve their function of completing the coupling loops between these cores. An odd-to-even transfer loop is effectuated by extending a lead 200 from a terminal 202 through the tube 111, back through the main apertures of the odd-numbered cores, and then through tube 111 once again. Thereafter, the lead 200 continues through the tube 114 from the end extending through the receive aperture of core 86, out through the other end of the tube, then back through the main apertures of all the even-numbered cores. Thereafter, the lead 200 extends again through the tube 114 to a terminal 204. The odd-to-even transfer winding thus passes through the respective transmit and receive apertures of the odd- and even-numbered cores twice and through their main apertures once in the manner indicated in FIGURE 3. The number of ampere turns and the direction of current flow through this winding will be the same as those of the odd-to-even transfer winding in FIGURE 3.

FIGURE 10B shows the arrangement for achieving an even-to-odd core-transfer winding, using the tubes 113 and 112, as well as the couplings 128, 130, and 132, to complete the transfer loops between the transmit apertures of the even-numbered cores and the receive apertures of the odd-numbered cores. The even-to-odd transfer winding includes a lead 206, extending from a terminal 208, through the tube 113, through the transfer aperture of the last of the even-numbered cores, back through the main aperture of all the even-numbered cores, then through the tube 113 again, then again through the transfer aperture of core 86, thereafter back through the transfer aperture of the first of the odd-numbered cores in the sequence. Lead 206 then extends through the tube 112, and then returns through all the main apertures of the odd-numbered cores. The lead then extends through the receive aperture of the first of the odd-numbered cores, through the tube again, and then to a terminal 210. Circulation of the contents of the register may be made by closing the connections between the loops 178 and 180 in the respective receive and transmit apertures of the first and last cores in the manner described in FIGURE 9, if desired.

Figure 9:
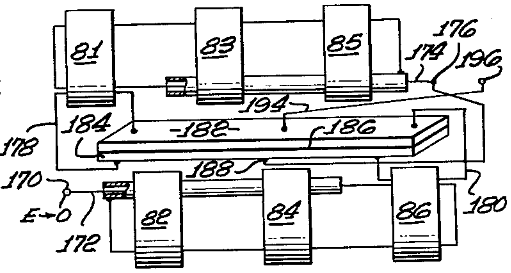
FIGURE 9 is a drawing of a circuit component for effectuating data circulation in a shift register in accordance with this invention.
Figure 11:
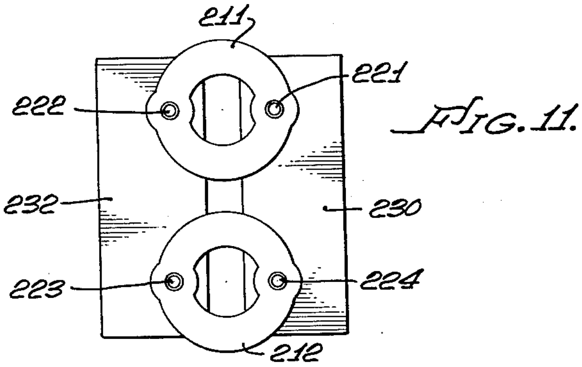
FIGURE 11 is a drawing illustrating shield placement in accordance with this invention.

Reference is now made to FIGURE 11, which shows another feature of this invention. Two multi-aperture cores 211 and 212 are shown in plan view, respectively representing an odd- and even-numbered core disposed in the offset manner proposed in this invention. The first and second tube, respectively 221 and 222, extend through the respective transmit and receive apertures of the odd-numbered cores; a third and fourth tube, respectively 223 and 224, extend through the transmit and receive apertures of the even-numbered cores. Any one of the conductors, such as 122, for example, which connects the first to the fourth tube, is represented in FIGURE 11 by a conductive shield 230. Any one of the conductors 128 through 132, which connects the second to the third tube, is represented in FIGURE 9 by a conductive shield 232. These conductive shields do a double duty. First, they form part of the coupling loop, and, second, they provide shielding between adjacent loops. This prevents the deleterious effects which may occur when the voltages induced in a coupling loop, as a result of a one-bit being transferred, can induce voltages in an adjacent loop. These currents may result in a false one being stored in the coupled cores where a zero actually is intended to be stored. Thus, these shields may be employed where it is desired to insure that spurious data is not generated within the shift register.

The shields need only extend a short distance beyond the magnetic cores in the manner shown in FIGURE 11. It will be understood that each one of the conductors 120 through 132 may comprise one of the shields shown in FIGURE 11.

An assembly of the shift register in accordance with this invention is simple. The shields either may have holes, whereby they may be mounted on the tubes alternately with the cores, or they may have slots whereby they may be slipped over the tubes after the cores are in place. The shields may be soldered in place, using dip-soldering techniques, if desired. The shields on the ends of a shift register may serve as the location for a connection of a winding instead of a tube. For example, in FIGURE 8A, if instead of conductions 120–126, shields are used, then connection of winding 160 may be made to the center of the shield used in place of conductor 120 and winding 164 may be connected to the center of the shield used in place of conductor 126. It should be noted that FIGURES 7, 8A, 8B, 9, 10A, and 10B show three different shift-register winding arrangements employing tubes. These arrangements are exemplary and are not to be construed as a limitation upon the invention.

There has accordingly been described and shown herein a novel and useful arrangement for simplifying the wiring required in a magnetic-core shift register, using multi-aperture cores. Thus, register manufacture may be effectuated more rapidly. Further, the size of the shift register can be reduced by reason of the packing of the cores permitted with the techniques described herein.

We claim:

1. In a data-storage register of the type having a plurality of magnetic cores in a numbered sequence, each core having transmit and receive apertures, first winding means coupling successive cores for advancing data from cores bearing odd numbers in said sequence to cores bearing even numbers, and second winding means coupling successive cores for advancing data from cores bearing even numbers in said sequence to cores bearing odd numbers, an improved construction comprising having all said cores bearing odd numbers in a column with their apertures aligned to form a column of odd-numbered cores, having all said cores bearing even numbers in a column with their apertures aligned to form a column of even-numbered cores, and having said columns of odd- and even-numbered cores adjacent one another with the cores in one column in offset relation relative to the cores of the other column.

2. A data-storage register comprising a plurality of toroidal magnetic cores each of which has two states of magnetic remanence, each of said magnetic cores having a data-transmit aperture, a data-receiving aperture, and a main aperture, said plurality of cores being in a numbered sequence, magnetic cores bearing odd numbers in said numbered sequence being spaced from one another and having their apertures aligned to form a column of odd-numbered cores, magnetic cores bearing even numbers in said numbered sequence being spaced from one another and having their apertures aligned to form a column of even-numbered cores, said column of even-numbered cores being adjacent said column of odd-numbered cores, a plurality of first data-transfer windings each of which couples the transmit aperture of a different one of the cores bearing odd numbers to the data-receive aperture of a succeeding one of the cores bearing even numbers, a plurality of second data-transfer windings each of which couples the data-transmit aperture of a different one of the cores bearing even numbers to the data-receive aperture of a succeeding one of the cores bearing odd numbers, means for applying data-advance excitation to all said first data-transfer windings to transfer data from said column of odd-numbered cores to said column of even-numbered cores, and means for applying data-advance excitation to all said second data-transfer windings to transfer data from said column of even-numbered cores to said column of odd-numbered cores.

3. A data-storage register as recited in claim 2 wherein said means for applying data-advance excitation to said first data-transfer windings to transfer data from said column of odd-numbered cores to said column of even-numbered cores includes a conductive connection between each of said first data-transfer windings and wherein said means for applying data-advance excitation to said second data-transfer windings to transfer data from said column of even-numbered cores to said column of odd-numbered cores includes a conductive connection between each of said second data-transfer windings.

4. A data-storage register as recited in claim 3 wherein said conductive connection between each of said first data-transfer windings includes a first tube passing through all of the aligned transmit apertures of the magnetic cores in said column of odd-numbered cores, and a second tube passing through all the aligned receive apertures of the magnetic cores in said column of even-numbered cores, and said conductive connection between each of said second data-transfer windings includes a third tube passing through all of the aligned transmit apertures of the magnetic cores in said column of even-numbered cores, and a fourth tube passing through all the aligned receive apertures of the magnetic cores in said column of odd-numbered cores.

5. A data-storage register as recited in claim 2 wherein said means for applying data-advance excitation to all said first data-transfer windings to transfer data from said column of odd-numbered cores to said column of even-numbered cores includes an inductively coupled odd-to-even advancing winding having a first portion extending through all the aligned transmit apertures in the magnetic cores in the column of odd-numbered cores, and a second portion extending through all the aligned receive apertures of the magnetic cores in the column of even-numbered cores; and wherein said means for applying data-advance excitation to all said second data transfer windings to transfer data from said column of even-numbered cores to said column of odd-numbered cores includes an inductively coupled even-to-odd advancing winding having a first portion extending through all the aligned transmit apertures in the magnetic cores in the column of even-numbered cores, and a second portion extending through all the aligned receive apertures of the magnetic cores in the column of odd-numbered cores.

6. A data-storage register comprising a plurality of toroidal magnetic cores each of which has two states of magnetic remanence, each of said magnetic cores having a data-transmit aperture, a data-receive aperture, and a main aperture, said plurality of cores being in a numbered sequence, magnetic cores bearing odd numbers in said numbered sequence being spaced from one another and having their apertures aligned to form a column of odd-numbered cores, magnetic cores bearing even numbers in said numbered sequence being spaced from one another and having their apertures aligned to form a column of even-numbered cores, said column of even-numbered cores being adjacent said column of odd-numbered cores, a plurality of first data-transfer windings each of which couples the transmit aperture of a different one of the cores bearing odd numbers to the data-receive apertures of a succeeding one of the cores bearing even numbers, a plurality of second data-transfer windings each of which couples the data-transmit aperture of a different one of the cores bearing even numbers to the data-receive aperture of a succeeding one of the cores bearing odd numbers, means for applying data-advance excitation to all said first data-transfer windings to transfer data from said column of odd-numbered cores to said column of even-numbered cores, including an odd-to-even advancing winding extending from a first terminal through aligned apertures in the magnetic cores in said column of odd-numbered cores and then through aligned apertures in the magnetic cores in said column of even-numbered cores to a second terminal, and means for applying data-advancing excitation to all said second data-transfer windings to transfer data from said column of even-numbered cores to said column of odd-numbered cores including an even-to-odd advancing winding extending from a third terminal through aligned apertures in the magnetic cores in said column of even-numbered cores and then through aligned apertures in the magnetic cores in said column of odd-numbered cores to a fourth terminal.

7. A data-storage register as recited in claim 6 wherein said odd-to-even advancing winding extends through the aligned apertures of the column of odd-numbered cores from said first terminal through all the aligned transmit apertures, then back outside of the column of odd-numbered cores to the first core in the column, then again through all the transmit apertures, then back outside of the column of odd-numbered cores to the first core in the column, then through all the transmit apertures, then extending back through the main apertures of the column of odd-numbered cores to the first core in the column of even-numbered cores, the winding then extends through the receive apertures of the column of even-numbered cores, then back through the main aperture of the cores in the column of even-numbered cores, then through the receive apertures, back around the outside of the column of even-numbered cores through the receive apertures again and then extends to said second terminal; said even-to-odd advancing winding extending through the aligned apertures of the column of even-numbered cores from said third terminal through all the transmit apertures, back around the outside of said column of even-numbered cores to the first core in the column, then through all said transmit apertures, back around the outside of said column of even-numbered cores, then through said transmit apertures, the winding then extending back through the main apertures of the cores in the column of even-numbered cores, then through the receive apertures in the cores of the column of odd-numbered cores back through the main apertures of said column of odd-numbered cores to the first core in said column and then through said receive apertures in the cores of said column, then back around the outside of said column of odd-numbered cores, and then through said receive apertures to said fourth terminal.

8. A data-storage unit comprising a plurality of magnetic cores, each of which has a major aperture and at least one minor aperture, and drive and coupling windings respectively threaded through the apertures of said cores, said data-storage unit being characterized by having the cores arranged in even and odd groups, the apertures of the cores in the even group being aligned with each other, the apertures of the cores in the odd group being aligned with each other, at least a portion of the cores in one group being offset from the corresponding portion of the cores in the other group.

9. A data-storage unit as recited in claim 8 wherein the drive windings are threaded lengthwise through aligned apertures in said groups respectively, and individual coupling windings are connected between an even core and the next odd core, and between an odd core and the next even core, respectively.

References Cited in the file of this patent

UNITED STATES PATENTS

| | | |
|---|---|---|
| 2,654,080 | Browne | Sept. 29, 1953 |
| 2,680,819 | Booth | June 8, 1954 |
| 2,730,695 | Ziffer | Jan. 10, 1956 |
| 2,781,503 | Saunders | Feb. 12, 1957 |
| 2,832,951 | Browne | Apr. 29, 1958 |
| 2,844,815 | Winick | July 22, 1958 |
| 2,911,630 | Dinowitz | Nov. 3, 1959 |
| 2,919,430 | Rajchman | Dec. 29, 1959 |
| 2,936,446 | Rosenberg | May 10, 1960 |
| 2,969,524 | Bennion | Jan. 24, 1961 |

OTHER REFERENCES

Publication I: "A High-Speed Logic System Using Magnetic Elements and Connecting Wire Only," by H. D. Crane, published in "Proceedings of IRE," January 1959, vol. 47, pp. 63–73.